(12) United States Patent
Mazzagatti, Jr.

(10) Patent No.: US 9,329,273 B1
(45) Date of Patent: May 3, 2016

(54) SYSTEMS AND METHODS FOR GUIDING SWIMMERS

(71) Applicant: Swim View, LLC, Houston, TX (US)

(72) Inventor: Francisco Nicholas Mazzagatti, Jr., Houston, TX (US)

(73) Assignee: Swim View, LLC, Houston, TX (US)

( * ) Notice: Subject to any disclaimer, the term of this patent is extended or adjusted under 35 U.S.C. 154(b) by 0 days.

(21) Appl. No.: 14/884,938

(22) Filed: Oct. 16, 2015

(51) Int. Cl.
*G01C 21/20* (2006.01)
*G01S 19/19* (2010.01)
*A63B 31/00* (2006.01)
*G01C 21/36* (2006.01)

(52) U.S. Cl.
CPC ............... *G01S 19/19* (2013.01); *A63B 31/00* (2013.01); *G01C 21/20* (2013.01); *G01C 21/3652* (2013.01)

(58) Field of Classification Search
None
See application file for complete search history.

(56) References Cited

U.S. PATENT DOCUMENTS

| | | | | | |
|---|---|---|---|---|---|
| 5,666,326 | A  * | 9/1997 | Holzschuh | .............. | G01S 3/801 367/118 |
| 7,512,036 | B2 * | 3/2009 | Crowell | .................... | G01S 5/30 367/127 |
| 8,654,610 | B2 * | 2/2014 | Megdal | ................. | G01S 5/0045 367/117 |
| 9,086,286 | B2 * | 7/2015 | Long | ..................... | G01C 21/20 |
| 2005/0219950 | A1 * | 10/2005 | Rowe | .................... | G01S 5/0226 367/118 |
| 2005/0265123 | A1 * | 12/2005 | Pope | ....................... | B63C 11/26 367/99 |
| 2006/0224352 | A1 * | 10/2006 | Baer | ...................... | G01C 21/12 702/150 |

(Continued)

FOREIGN PATENT DOCUMENTS

WO     WO 9964894 A2 *   12/1999            G01S 1/725

OTHER PUBLICATIONS

Wojciech Gelmuda and Andrzej Kos, Vibrating Bracelet Interface for Blind People, Proceedings of Electrotechnical Inst Itute, Issue 260, pp. 199-206, 2012.
http://www.swimiolite.com/.

(Continued)

*Primary Examiner* — Jonathan M Dager

(57) ABSTRACT

A system for guiding a swimmer that includes a destination device configured to be arranged near a destination location which a swimmer will swim towards. The system further includes directional determination equipment configured to determine a direction the swimmer should swim towards based, at least in part, on the swimmer's current position in reference to the destination device. The system further includes directional guidance equipment configured to indicate to the swimmer the determined direction the swimmer should swim towards, wherein the directional guidance equipment includes a first guidance device configured to be worn by the swimmer while swimming and having first vibration hardware for vibrating the first guidance device, and wherein the directional guidance equipment dynamically indicates for the swimmer to swim in the direction via at least the first vibration means.

24 Claims, 5 Drawing Sheets

(56) References Cited

U.S. PATENT DOCUMENTS

| | | | | |
|---|---|---|---|---|
| 2007/0140057 | A1* | 6/2007 | Webb | B63C 11/26 367/118 |
| 2009/0018771 | A1* | 1/2009 | Hollis | B63C 11/32 701/469 |
| 2009/0135022 | A1* | 5/2009 | Hollis | B63C 11/26 340/850 |
| 2009/0141591 | A1* | 6/2009 | Basilico | G01S 1/72 367/128 |
| 2009/0216444 | A1* | 8/2009 | Crowell | G01S 5/0045 701/469 |
| 2009/0295596 | A1* | 12/2009 | Downey | A63B 24/0021 340/850 |
| 2009/0301185 | A1* | 12/2009 | Duk | G01C 22/00 73/198 |
| 2010/0268454 | A1* | 10/2010 | Fountain | G01C 21/34 701/533 |
| 2013/0257621 | A1* | 10/2013 | Juergensen | B63C 11/02 340/626 |
| 2014/0126334 | A1* | 5/2014 | Megdal | H04B 11/00 367/117 |
| 2014/0172296 | A1* | 6/2014 | Shtukater | G01S 19/13 701/522 |
| 2014/0277628 | A1* | 9/2014 | Nieminen | G06K 9/00342 700/91 |

OTHER PUBLICATIONS http://share.iit.edu/bitstream/handle/10560/1709/Swimming%20Aid%20For%20Visually%20Impaired%20Swimmers%20IPRO%20310%20Project%20Plan%20Su08.pdf?sequence=4.
http://www.navimate.com/; http://www.navimate.com/NavimateDEMA2.zip.

* cited by examiner

SYSTEMS AND METHODS FOR GUIDING SWIMMERS

TECHNICAL FIELD

The present disclosure generally relates to guiding swimmers to one or more destination points and, more specifically, systems and method for guiding visually impaired swimmers thereto via one or more guidance devices worn by the swimmer.

BACKGROUND

Those who are visually impaired are required to overcome various obstacles while swimming. For example, when swimming in a lap pool or indoor pool, the swimmer may continuously run into, or be required to use, the wall or lane divider in order to swim straight or from one desired point to another. Moreover, during a swim competition, an individual at either end of the pool may use a "tapper" to signal the swimmer of the upcoming end of the pool. The tapper can be manufactured from a variety of materials, but typically consists of a pole with a rubber or styrofoam tip at the end to "tap" the swimmer's head and/or shoulder region as they approach the pool end.

Upon being tapped, the swimmer is supposed to either stop, or turn around, possibly by performing a flip turn. However, even with such a configuration, if the swimmer is not tapped at the proper time, problems may still arise. For example, if the swimmer is swimming too fast or if the tapper individual is not paying attention, the swimmer may run into the wall. Alternatively, incorrect tapping timing may affect the efficiency of the swim flip, thereby increasing the swimmer's overall race time.

Even further problems arise during open water swims. For example, during triathlons, the visually impaired swimmer is typically physically tied to a non-impaired swimmer in order to be guided along the swim route. This is cumbersome and restrictive on both swimmers for the numerous reasons one can imagine. Moreover, such presents safety hazards, such as if one swimmer were to have health issues during the swim, the other swimmer may be endangered due to being physically connected.

Currently, there are various solutions to help non-visually impaired swimmers perform better, but such solutions are visual aids, such as LED lighting, to be paired with swim goggles for assisting the swimmer to stay on a straight line or on course. Obviously, however, such fails to be a viable solution for those who are visually impaired. Some of these aids include GPS tracking, however such still fails to be a viable solution as GPS will not work in an indoor environment due to the GPS signal being blocked by the building. Moreover, GPS accuracy allowed to civilian devices fails to meet the criteria required by visually impaired swimmers. GPS accuracy for civilian devices may only have an accuracy of 5 or 10 feet, at best, while a visually impaired swimmer requires accuracy of 18-24" from the pool wall to assure collision prevention, and allow accurate flip turns.

Accordingly, an improved system having a destination device and one or more guidance devices to be worn by the visually impaired swimmer that allows increased accuracy remains highly desirable.

SUMMARY OF THE INVENTION

The present disclosure introduces various illustrative embodiments for guiding visually impaired swimmers to one or more destination points via one or more guidance devices worn by the swimmer.

It is an object of the present disclosure to provide a system for guiding a swimmer that includes a destination device configured to be arranged near a destination location which a swimmer will swim towards. The system further includes directional determination equipment configured to determine a direction the swimmer should swim towards based, at least in part, on the swimmer's current position in reference to the destination device. The system further includes directional guidance equipment configured to indicate to the swimmer the determined direction the swimmer should swim towards, wherein the directional guidance equipment includes a first guidance device configured to be worn by the swimmer while swimming and having first vibration hardware for vibrating the first guidance device, and wherein the directional guidance equipment dynamically indicates for the swimmer to swim in the direction via at least the first vibration means.

It is another object of the present disclosure to provide a method for guiding a swimmer that includes determining a direction a swimmer should swim towards based, at least in part, on the swimmer's current position in reference to a destination device, and dynamically indicating to the swimmer the determined direction via at least a first guidance device configured to be worn by the swimmer while swimming and having first vibration equipment for vibrating the first guidance device.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as an exclusive embodiments. The subject matter disclosed is capable of considerable modification, alteration, and equivalents in form and function, as will occur to one having ordinary skill in the art and the benefit of this disclosure.

DETAILED DESCRIPTION

Figure 1:
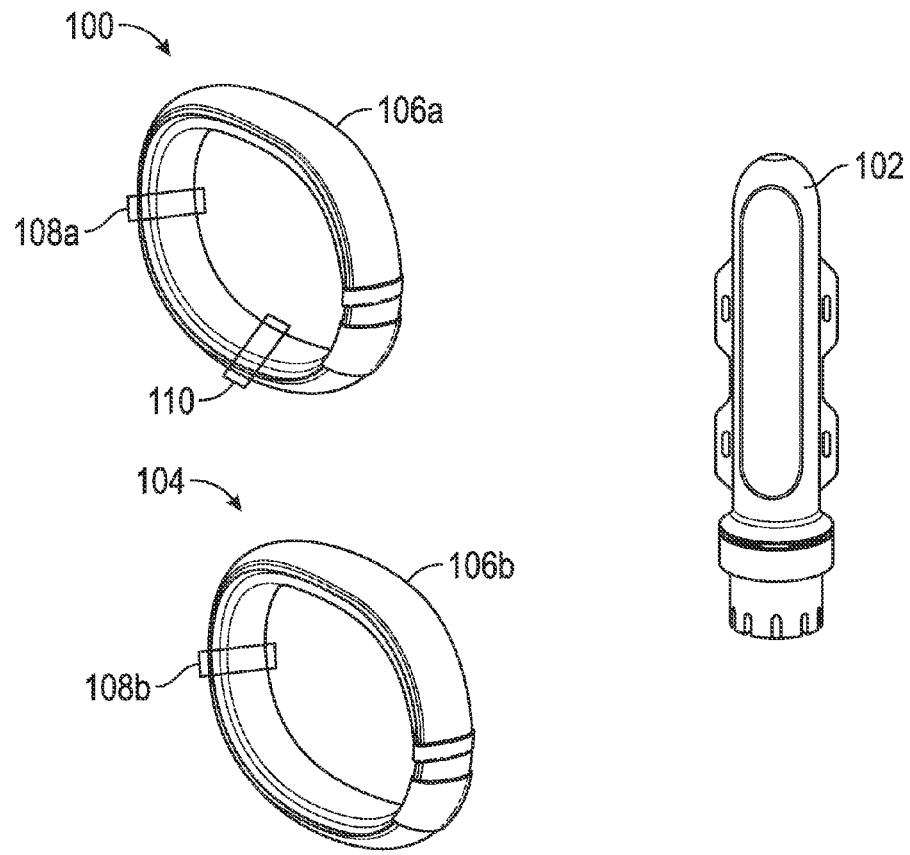
FIG. 1 depicts a system for guiding a swimmer, according to one or more embodiments.

The present disclosure generally relates to guiding swimmers to one or more destination points and, more specifically, systems and method for guiding visually impaired swimmers thereto via one or more guidance devices worn by the swimmer.

In one embodiment, an illustrative system includes a system for guiding a swimmer that includes a destination device configured to be arranged near a destination location which a swimmer will swim towards. The system further includes directional determination equipment configured to determine a direction the swimmer should swim towards based, at least in part, on the swimmer's current position in reference to the destination device. The system further includes directional guidance equipment configured to indicate to the swimmer the determined direction the swimmer should swim towards, wherein the directional guidance equipment includes a first guidance device configured to be worn by the swimmer while swimming and having first vibration hardware for vibrating the first guidance device, and wherein the directional guidance equipment dynamically indicates for the swimmer to swim in the direction via at least the first vibration means.

In another illustrative embodiment, a method for guiding a swimmer includes determining a direction a swimmer should swim towards based, at least in part, on the swimmer's current position in reference to a destination device, and dynamically indicating to the swimmer the determined direction via at least a first guidance device configured to be worn by the swimmer while swimming and having first vibration equipment for vibrating the first guidance device.

Such systems and methods illustrated and described herein present many advantages. For example, in a lap pool setting, such will improve a swimmer's race times, as they will not be running into the lane dividers and will be swimming in a more direct route between pool ends. Additionally, the swimmer can focus on stroke technique, thereby increasing swim efficiency, along with having more accurate flip turns, further reducing race times. Moreover, such system and methods will help to improve the swimmer's quality of life through increased independence.

Many of these advantages further transfer to open water swims, thereby enabling the swimmer to have increased speed and reduced race times. Moreover, even if not visually impaired, such systems and methods help the swimmer by allowing them to concentrate on breathing and swimming, and not losing time and concentration to look up and see the swim route and/or correct their deviation. Additionally, the visual impaired swimmer is independent of a guide swimmer, thereby reducing safety risks for both swimmers.

In a diving environment, advantages include allowing the diver to know not only how deep they are, but how far away from the dive boat they are, which may be critical for air use determination. Moreover, less air may be required for the diver to return to the dive boat as the diver is swimming in a straight path of return to the boat. Additionally, the dive boat personnel can signal the divers to return to the boat if necessary for any number of reasons, such as an emergency or impending dangerous weather or sea conditions.

As used herein, "visually impaired" includes those who are partially visually impaired (e.g., not 20/20 vision) or fully visually impaired (e.g., "blind").

As used herein, a "processor" may be comprised of, for example and without limitation, one or more processors (each processor having one or more cores), microprocessors, field programmable gate arrays (FPGA's), application specific integrated circuits (ASICs) or other types of processing units that may interpret and execute instructions as known to those skilled in the art.

As used herein, "memory" may be any type of storage or memory known to those skilled in the art capable of storing data and/or executable instructions. Memory may include volatile memory (e.g., RAM), non-volatile memory (e.g., hard-drives), or a combination thereof. Examples of such include, without limitation, all variations of non-transitory computer-readable hard disk drives, inclusive of solid-state drives. Further examples of such may include RAM external to a computer or controller or internal thereto (e.g., "on-board memory"). Example embodiments of RAM may include, without limitation, volatile or non-volatile memory, DDR memory, Flash Memory, EPROM, ROM, or various other forms, or any combination thereof generally known as memory or RAM. The RAM, hard drive, and/or controller may work in combination to store and/or execute instructions.

Referring now to the drawings, wherein like reference numbers are used herein to designate like elements throughout the various views and embodiments of a unit. The figures are not necessarily drawn to scale, and in some instances the drawings have been exaggerated and/or simplified in places for illustrative purposes only. One of the ordinary skill in the art will appreciate the many possible applications and variations based on the following examples of possible embodiments. As used herein, the "present disclosure" refers to any one of the embodiments described throughout this document and does not mean that all claimed embodiments must include the referenced aspects.

FIG. 1 depicts a system 100 for guiding a swimmer, according to one or more embodiments. As depicted, the system 100 includes a destination device 102 and a directional guidance means 104 for directing a swimmer towards the destination device 102. The destination device 102 is to be arranged at or near a destination location which a swimmer will swim towards, for example, at one or both ends of a lap pool. The destination device 102 may be arranged underwater in the pool, or out of water near the edge of the pool end (e.g., a starting platform). In further embodiments, the system 100 may include a plurality of destination devices 102 arranged in sequence to define a particular swimming route, such as used for a triathlon. In further embodiments, the destination device 102 may be arranged on or near a boat during diving expeditions, thereby enabling the diver to easily be directed back towards the boat if necessary or when surfacing from a dive.

The directional guidance means 104 is configured to dynamically indicate to the swimmer which direction they should turn or veer in order to maintain a direction towards the destination device 102 or course. In other words, the directional guidance means is not merely a passive visual indicator, but is an active method for continuously monitoring the swimmer's position relative to the destination device and instructing the swimmer in what direction to turn to maintain a desired path or course.

The directional guidance means 104 includes a first guidance device 106a to be worn by the swimmer. In one embodiment, as depicted, the first guidance device 106a may be in the form of an oval or circular nature capable of being worn on any of the swimmer's extremities. For example, the first guidance device 106a may be worn on the swimmer's arm, which one of skill in the art will appreciate to include at least any portion of the arm, including but not limited to the upper arm (e.g., near the shoulder), mid-arm (e.g., near the elbow), lower arm (e.g., the wrist), anywhere in between, along with any portion of the hand and fingers as well. In other embodiments, the first guidance device 106a may be worn on the swimmer's leg, which one of skill in the art will appreciate to include, for example and without limitation, the upper leg (e.g., thigh), mid-leg (e.g., near the knee), lower leg (e g, ankle), any portion therebetween and any portion of the foot or toes as well. The first guidance device 106a may be a stretchable material, such as a rubber material, or may clasp together to prevent removal from the swimmer while swimming. Advantageously, such flexibility to be arranged on any of the swimmer's limbs allows for swimmers with missing limb portions (e.g., missing wrist or arm) to still use the system 100 on any of their remaining limbs and enable the joy of efficient swimming.

The first guidance device 106a includes a first vibration mean 108a for vibrating the first guidance device 106a according to which direction the swimmer should turn, if any. The first vibration means 108a may be any technology capable of vibrating the first guidance device 106a such that the vibrations are capable of being detected by the swimmer while swimming. For example and without limitation, the first vibration means 108a may be an electric motor or micro vibration motor arranged within the first guidance device 106a. The first guidance device 106a may indicate which direction to turn via different vibration patterns and vibration length (long and short vibrations or pulses). For example, a series of short vibrations may indicate the swimmer needs to veer left, while one long vibration may indicate the swimmer needs to veer right. Intensity, repetitiveness, or other vibration patterns may further indicate the severity of course correction required. The first vibration means 108a may be silent (no vibrations) indicating the swimmer is on course. Alternatively, for example, the first vibration means may continuously emit a single vibration after a predetermined amount of time so long as the swimmer is on course.

In another embodiments, the directional guidance means 104 further includes a second guidance device 106b, wherein the second guidance device 106b is substantially similar to the first guidance device 106a. The second guidance device 106b includes a second vibration means 108b for vibrating the second guidance device 106b in a fashion detectable by the swimmer. In such an embodiment, the first guidance device 106a may be worn on one of the swimmer's right extremities (e.g., the swimmer's right arm or wrist), wherein the second guidance device 106b is worn on one of the swimmer's left extremities (e.g., the swimmer's left arm or wrist). Such an embodiment is advantageous by allowing further configuration, and possibly more intuitive guidance to the swimmer. For example, the embodiment may function such that only the first guidance device 106a on the swimmers right extremity (e.g., wrist) is activated to signal the swimmer should veer right, whereas only the second guidance device 106b on the swimmer's left extremity (e.g., left wrist) may be activated to indicate the swimmer should veer left.

The directional guidance means 104 determines which direction to guide the swimmer via a directional determination means (as depicted, directional determination means 110). The direction determination means 110 determines which direction the swimmer should swim, based at least in part on the swimmer's current position in reference to the destination device 102. The direction determination means can be arranged in the destination device 102, the direction guidance means 104 (as depicted), an independent computer or system communicably coupled to the system 100, or a combination thereof.

As depicted, the directional determination means 110 is encompassed within the first guidance device 106a. The destination device 102 may be a passive device and the directional determination means 110 may use one or more technologies to ping or determine the location of the destination device 102 and/or location of the swimmer in reference to the destination device 102. For example, the directional determination means 110 may use global positioning systems (GPS) technology for general guidance of where the destination device 102 and/or swimmer is located. Alternatively, or in addition thereto, the directional determination means 110 may use radio frequencies (RF), Infrared (IR), laser beams, sonar, acoustic, proximity sensors (underwater, above water, or both), Bluetooth, Wi-Fi, and/or other long or short range wireless technology to obtain the position of the destination device 102 and/or the distance of the swimmer therefrom. Advantageously, such technologies enable more accurate distance and location determination as compared to civilian GPS, which is generally only accurate to 5 or 10 feet, at best.

In some embodiments, such technology may be implemented by only the first or second guidance devices 106a or 106b. In other embodiments, such technology may be implemented in both the first and second guidance devices 106a and 106b, thereby possibly obtaining a more accurate determination of distance to the destination device 102 or location. While GPS may be employed, it is not required in all embodiments, which is advantageous especially when swimming in an indoor pool where GPS signal is likely weak or unavailable.

Advantageously, such a system enables the swimmer (visually impaired or not) to concentrate on their swimming technique, including breathing and stroke, and no longer have to break their stride to see (or be tapped) where the end of the pool is. Moreover, the visually impaired swimmer will no longer worry about running into the pool wall, lane divider, or possibly others swimming in the opposite direction when there is a shared lane.

Figure 2:
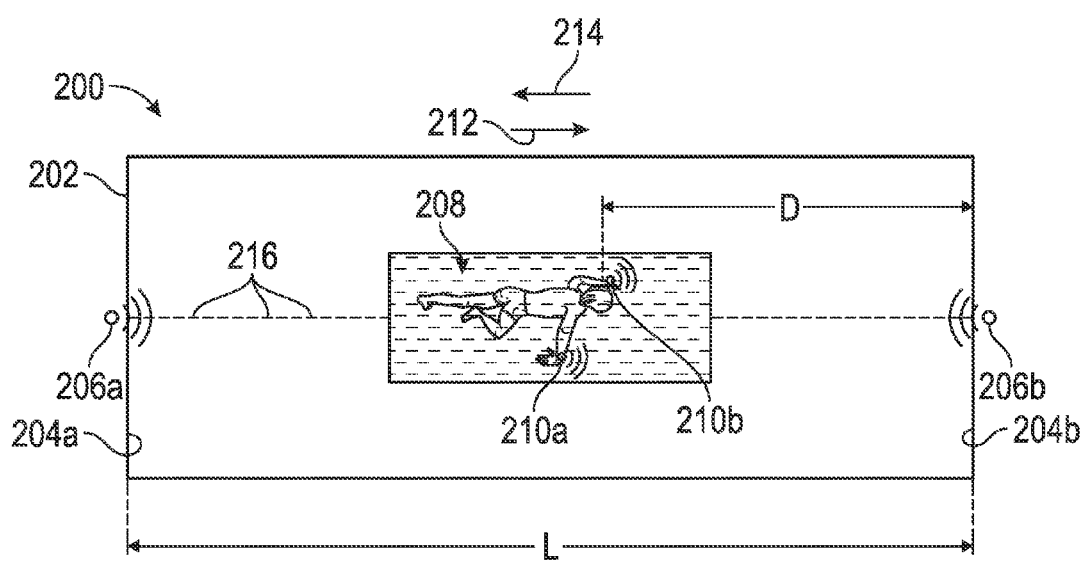
FIG. 2 depicts a top-down view of a diagram of a swimming pool where the system of FIG. 1 may be implemented, according to one or more embodiments.

FIG. 2 depicts a top-down view of a diagram 200 of a swimming pool 202 where the system 100 may be implemented, according to one or more embodiments. As depicted, the swimming pool 202 is a lap pool that is rectangular in nature which has a first end 204a and a second end 204b. The first end 204a and second end 204b are a length L apart, thus defining the length of the pool, which may be 25 or 50 meters, as is typical for competition swims.

Diagram 200 further depicts a first destination device 206a arranged at or near the first end 204a of the pool 202, and a second destination device 206b arranged at or near the second end 204b of the pool 202. The first destination device 206a and second destination device 206b may be substantially similar to the destination device 102 of FIG. 1.

Diagram 200 further depicts a swimmer 208 in the pool 202 at a distance D from the second destination device 206b. As depicted, the swimmer 208 is wearing one embodiment of the direction guidance means 104 discussed above which includes a first guidance device 210a on their right arm and a second guidance device 210b on their left arm. The first and second guidance device, 208a and 208b, respectively, may be substantially similar to the first and second guidance devices 108a and 108b of FIG. 1.

Initially, the swimmer may begin at the first destination device 206a and swim in a first direction 212 towards the second destination device 206b. In one embodiment, the system 100 may operate to keep the swimmer 208 within a certain deviation of a center line 216 (in dashed) of the pool 202 or particular lane the swimmer 208 is swimming in to prevent the swimmer from running into the lane dividers or side of the pool 202. Such may be accomplished by the system having knowledge of where the center line 216 is, possibly by the first destination device 206a and the second destination device 206b being arranged along substantially the same path. Upon the swimmer 208 veering to the left of the center line 216 by more than the predetermined deviation, the first guidance device 206a on the swimmer's 208 right arm may vibrate in a predetermined pattern to alert the swimmer they should veer to the right. Similarly, if the swimmer 208 veers to the right of the center line 216 by more than the predetermined deviation, the second guidance device 206a on the swimmer's 208 left arm may vibrate in a predetermined pattern to alert the swimmer they should veer to the left.

Moreover, advantageously, as the swimmer 208 approaches the second destination device 206b, the system 100 alerts the swimmer as to the proximity thereto via one or more of the technologies discussed herein. For example, the first and/or second guidance devices, 210a and/or 210b, may increase in vibration intensity as the swimmer decreases the distance D to the second destination device 206b. Additionally, in other embodiments, the system 100 may alert the swimmer 208 of being within a predetermined distance from the second destination device 206b (e.g., within 18" or 24"). Such an alert may be performed via both the first and second guidance devices, 210a and 210b, vibrating simultaneously, or a unique vibration pattern. Similar guidance can be provided when the swimmer is swimming in the second direction 214 towards the first destination device 206a.

In further embodiments, the system 100 can be programmed to guide the swimmer such that they maintain a course only on one side of the center line 216, which may be required, for example, when there are multiple swimmers in a single lane.

Figure 3:
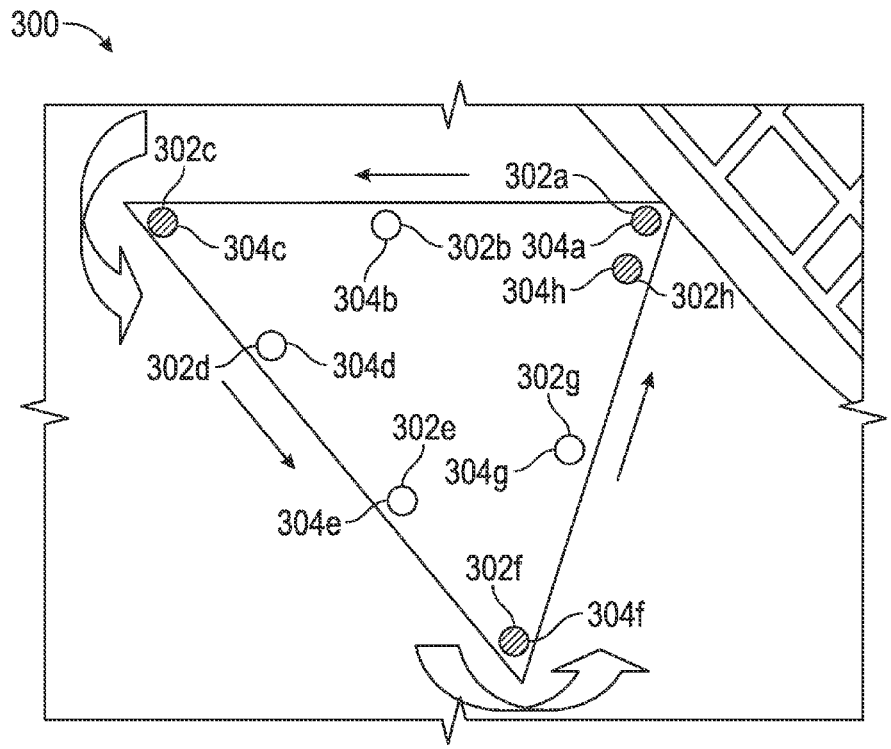
FIG. 3 depicts an open water swimming course which the system may guide a swimmer around, according to one or more embodiments.

FIG. 3 depicts a course 300 which the system 100 may guide a swimmer around, according to one or more embodiments. Such a course 300 may be employed, for example, for an open water swim such as a triathlon. As depicted, the course 300 includes a plurality of floating buoys 302a-h (depicted as a first buoy 302a, second buoy 302b, third buoy 302c, fourth buoy 302d, fifth buoy 302e, sixth buoy 302f, seventh buoy 302g, and eighth buoy 302h). The swimmer begins on shore and swims towards the first buoy 302a, continuing on in a direction towards the third buoy 302c. The swimmer swims past the third buoy 302c and turns to swim towards and around the sixth buoy 302f. The swimmer then turns and swims back towards shore and towards the eighth buoy 302h.

As noted in the background section, for an open water swim, a visually impaired swimmer is typically either physically tethered to a guide swimmer to be guided around the course 300. Other visual aids are available for all swimmers, however such fails to be a viable solution for those who are visually impaired. In one embodiment, the system 100 of FIG. 1 may guide a swimmer through the course 300 via the directional guidance means 104 and a plurality of destination devices 102—depicted in FIG. 3 as destination devices 304a-h (a first, second, third, fourth, fifth, sixth, seventh, and eighth destination device 304a, 304b, 304c, 304d, 304e, 304f, 304g, and 304h, respectively). The destination devices 304a-h are arranged at or near each of the buoys 302a-h, for example, the first destination device 304a is arranged at or near the first buoy 304a, the second destination device 304b is arranged at or near the second buoy 304b, and so on. Each destination device 304a-h includes a unique identifier or ID, thereby enabling individual identification of each by the directional guidance means 104. The system 100 may employ one embodiment using only the first guidance device 106a, or may employ another embodiment which further incorporates the second guidance device 106b to guide the swimmer between destination devices 102.

In one embodiment, the system may employ multiple technologies to guide the swimmer between destination devices 304a-h. For example, the directional guidance means 104 may be pre-programmed with the route, thereby having knowledge of the GPS location of each of the destination devices 304a-h, along with their unique ID. The directional guidance means 104 may employ GPS technology to generally track the swimmer and indicate which direction to turn in order to continue on a path towards the next destination device 304a-h. In another embodiment, alternative technology may be employed once the swimmer is within a certain range of the upcoming destination device 304a-h to increase accuracy of guiding the swimmer. For example, sonar or RF technology may be employed. Viability of any one or multiple technologies is dependent upon the technology capabilities and the particular swim course, as some swim courses may arrange the buoys 302a-h closer or farther apart than other courses.

Additionally, if buoys 302a-h, and thus destination devices 304a-h are within close proximity, the destination device unique identifier allows the system 100 to properly guide the swimmer in the correct direction. For example, as depicted, at the beginning of the race, it is possible that the first destination device 304a is close enough to the eighth destination device 304h that the directional guidance means 104 may be capable of communicating with both. However, since the system 100 knows that the first destination device 304a has a unique identifier (e.g., ID 1), the system 100 will guide the swimmer towards the first destination device 304a instead of guiding the swimmer towards the eighth destination device 304h (with a unique identifier of, for example, ID 8). Moreover, should the course 300 require multiple laps, the system 100 can guide the swimmer around the course 300 for a first time and, upon teaching the eight destination device 304h (with ID 8), next guide the swimmer again to the first destination device 304a (with ID 1) to begin the next lap.

Figure 4:
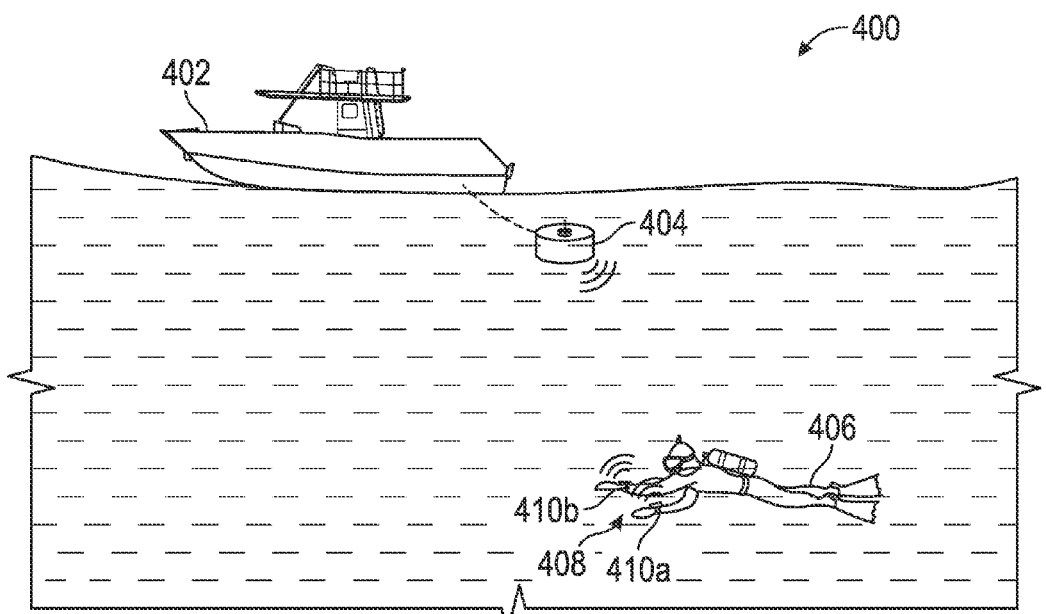
FIG. 4 depicts a diagram illustrating the system being employed in a diving environment, according to one or more embodiments.

Turning now to FIG. 4, depicted is a diagram 400 illustrating the system 100 being employed in a diving environment, according to one or more embodiments. The diagram 400 illustrates a dive boat 402 coupled to a destination device 404, thereby enabling a diver 406 wearing a directional guidance means 408 to be guided back towards the dive boat 402 upon ascent from their dive. The destination device 404 may be similar to the destination device 102 of FIG. 1, and the directional guidance means 408 may be similar to the directional guidance means 104 of FIG. 1, and therefore will not be described again in detail. The destination device 404 may float on top of the water, or be partially or wholly submerged underwater.

A current problem with diving is the diver's 406 lack of visibility to the boat's 402 location during the dive. Thus, as the diver 406 ascends from their dive, they may surface a far distance away from the boat. One current solution is to have a dive line which the divers can either be tethered to, or locate during their dive to directly ascend to the boat. However, such is cumbersome and restrictive on the diver, and may still be tedious to locate. To alleviate these problems, as described herein, in one embodiment, a direction determination means (e.g., direction determination means 110) determines which direction the diver 406 should turn to swim towards the destination device 404. Any one or more of the various technologies described herein may be employed for such a determination. Advantageously, at least in one embodiment, GPS may not be required, thereby alleviating issues of receiving GPS signal while diving. Other technologies, for example and without limitation, such as sonar or RF may be employed to determine the direction to the destination device 404.

Upon determination of which direction the diver 406 should swim, the directional guidance means 408 guides the diver 406 in that direction. As depicted in FIG. 4, the directional guidance means 408 including a first guidance device 410a arranged on the divers right arm, and a second guidance device 410b arranged on the diver's left arm. Therefore, the first guidance device 410a may vibrate to indicate the diver 406 should veer right, and the second guidance device 410b may vibrate to indicate the diver 406 should veer left.

In further embodiments, personnel on the boat 402 can employ the system, including a control device (not shown) to communicate with the diver 406. The control device may be any type of computing device, including a computer, laptop, cellular telephone, iPad, etc. configured to be communicably coupled to the directional guidance means 408, in one embodiment, via the destination device 404. The control device may have a user interface such as that described below in FIG. 6. In one exemplary operation, a signal is sent from the destination device 404 to the directional guidance means 408, which may activate the directional guidance means 408 (e.g., cause the directional guidance means 408 to vibrate, possibly in a unique pattern), thereby sending a message to the user. Advantageously, such a message may be for the swimmer 406 to return to the boat because of bad weather, or their air supply is running low, or for any other reason as well.

Figure 5:
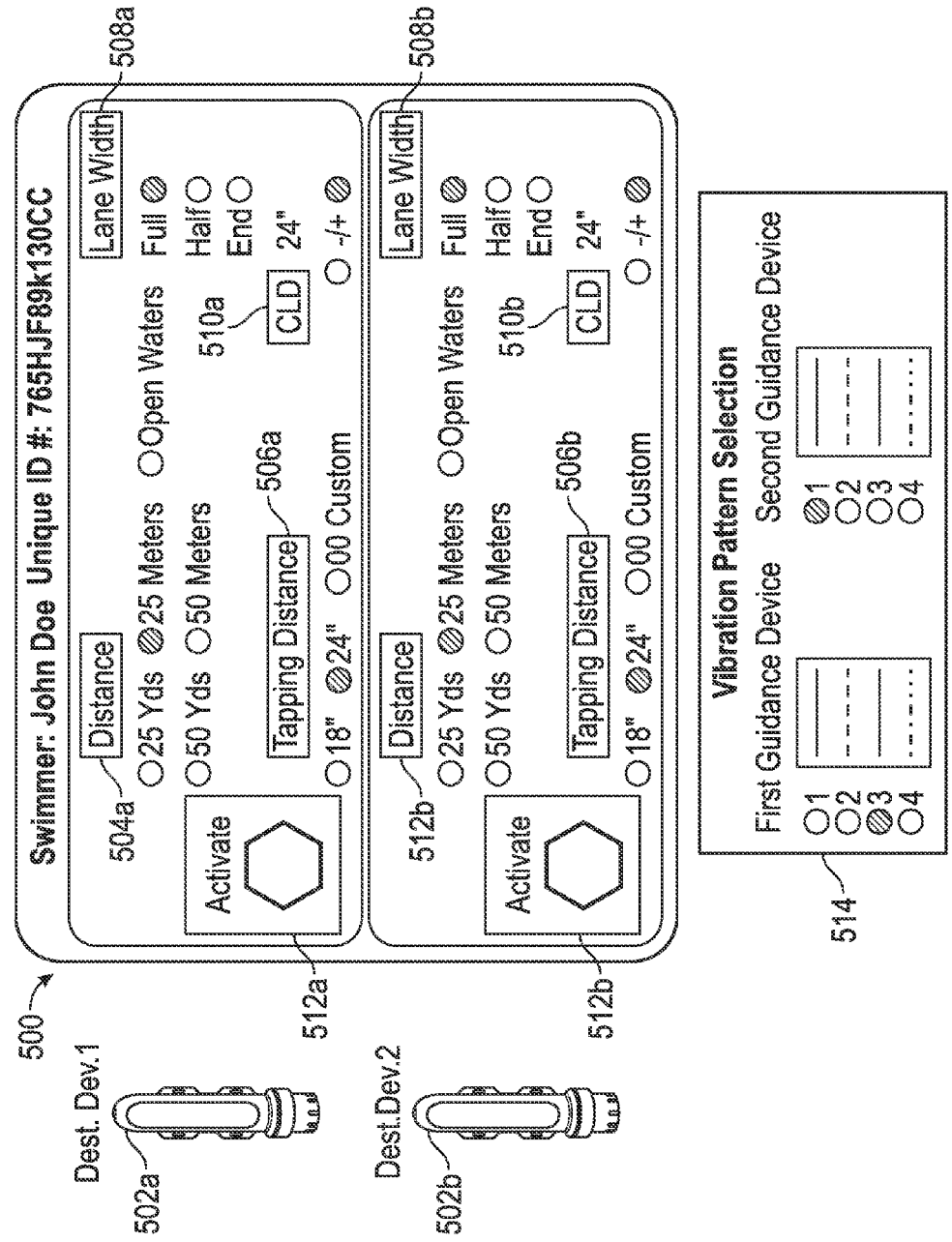
FIG. 5 depicts a user interface for configuring the system in a pool environment, according to one or more embodiments.

FIG. 5 is a user interface 500 for configuring the system 100 in a pool environment, according to one or more embodiments. As depicted, the system (e.g., system 100) can be programmed from an app or software running on an electronic device, including but not limited to, a software program on a computer and/or a mobile app running on a cellular telephone or wireless device (e.g., iPad, laptop, tablet, etc.). The system can be communicably coupled to the electronic device via any wired or wireless technology capable of transferring data known to those skilled in the art, including but not limited to, Wi-Fi, Bluetooth, USB (regular, micro, mini-USB, etc.), and the like.

The user interface 500 enables configuring a system with one or more destination devices for a lap pool. As depicted, configuration of a first destination device 502*a* includes setting the pool distance 504*a*, or alternatively indicating if the swim is an open water swim. The configuration further includes setting the "tapping distance," such as 18", 24", or a custom distance from the first destination device 502*a*. In other embodiments, the configuration further includes setting the lane width 508*a*. As previously discussed, a swimmer may have the entire lane to themselves, or may alternatively be swimming with others and therefore be required to swim only on one side of the lane (the "half" lane setting). Moreover, some pools have a wider "end" of the lane. In other embodiments, the configuration may enable setting the center line deviation (CLD) 510*a* which is the deviation from the center line allowed before the system alerts the swimmer to course correct. Once available selections have been made, an "activate" or other submission button may be employed to store the configuration and/or download it to the system. One or more of such settings are also employed in those embodiments that include additional destination devices, such as the second destination device 502*b* which may be placed at the end of the pool opposite the first destination device 502*a*. Thus, the second destination device 502*b* may also be configured with settings related to the pool distance 504*b*, tapping distance 506*b*, lane width, 508*b*, and CLD 510*b*, along with an activation or submission button 512*b*.

In further embodiments, as depicted in box 514, the guidance device(s) may be programmed with a selectable or customizable vibration pattern. As depicted, the system includes a first guidance device and a second guidance device, wherein there are four unique vibration patterns available to choose from for each. As depicted, the third option is selected for the first guidance device, and the first option is selected for the second guidance device. Again, while not depicted, in further embodiments, such vibration patterns may be fully customizable.

Figure 6:
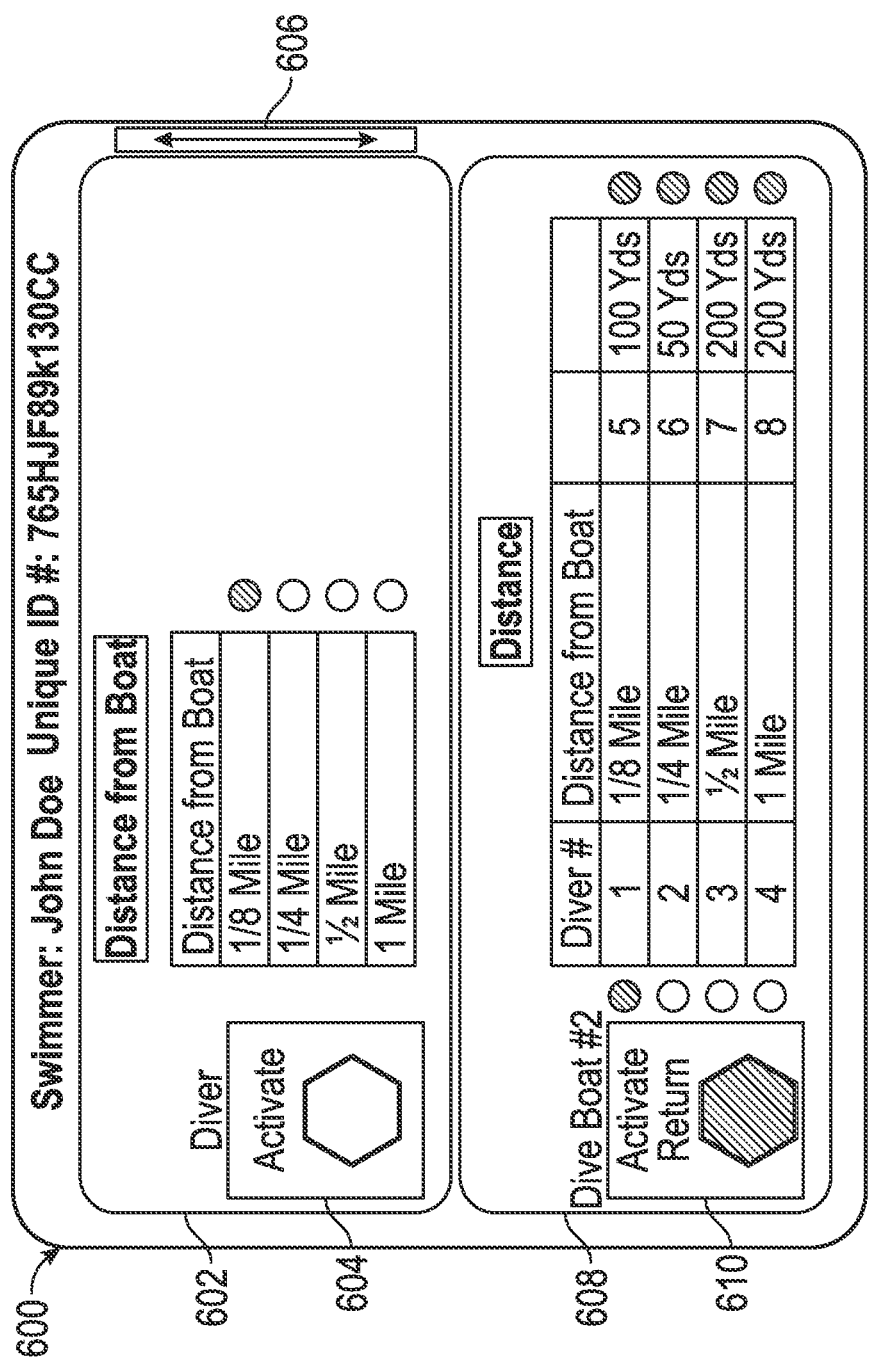
FIG. 6 depicts a user interface for operating the system in a diving environment, according to one or more embodiments.

FIG. 6 is a user interface 600 for operating the system in a diving environment, according to one or more embodiments.

As depicted, the user interface 600 enables configuration of distance indication (distance away from the boat) for each diver, enables personnel on the dive boat to view how far away each of the divers is, and also enables signaling one or more of the divers to return to the boat. The first portion 602 of the user interface 600 enables configuration of the system to alert a particular diver (e.g., "John Doe") when they are a predetermined distance away from the boat. As depicted, the distance options are ⅛ mile, ¼ mile, ½ mile, and 1 mile, however such are merely exemplary and may be fully customizable. The first portion 602 also includes an activation button 604 which sets or activates the selected configuration, or possibly downloads such to the diver's directional guidance means (e.g., directional guidance means 408 of FIG. 4). The first portion 602 further includes a scroll 606 to view information for each individual diver.

The user interface 600 further includes a second portion 608 which indicates the distance from the boat of one or more divers—as shown, the second portion 608 indicates the distance of all divers. More specifically, for example, the second portion 608 indicates diver 1 is ⅛ mile from the boat, diver 2 is ¼ mile from the boat, and so on. Advantageously, dive boat personnel can "activate" the directional guidance means for all divers simultaneously with a second activate button 610, thereby reducing the time it would otherwise take to "activate" the directional guidance means for each diver individually.

Figure 7A:
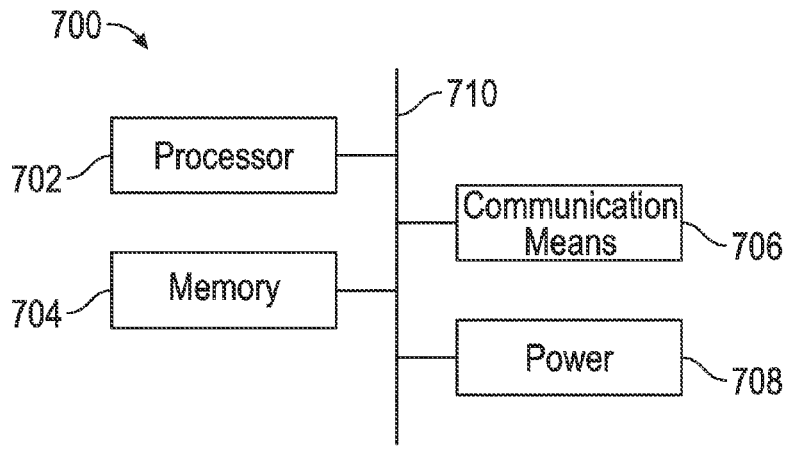
FIG. 7A depicts a block diagram of the destination device, according to one or more embodiments.

FIG. 7A is a block diagram 700 of the destination device, according to one or more embodiments. As depicted, the block diagram 700 includes a processor 702 and a memory 704 (both of which are defined above), a communication means 706, and a power source 708, one or more of which being electrically coupled by one or more busses 710. In some embodiments, the memory 704 may retain information about the destination device, such as its unique ID. Moreover, the memory 704 may retain information related to how often, and which directional guidance means the destination device was inquired by. In some embodiments, the communication means 706 may include one or more of the technologies discussed herein, including, but not limited to, GPS, Wi-Fi, Sonar, RF, Bluetooth, and the like. Advantageously, such enables the destination device to either act as a passive or active device.

As a passive device, the directional determination means is incorporated into the guidance device worn by the swimmer. As an active device, the destination device processor 702 may work individually, or in combination with the guidance device, to determine the location of the swimmer and which direction the swimmer should veer to most efficiently head towards the destination device. Similarly, the processor 702, either alone or in combination with the guidance device, may act as a distance determination means, thereby determining the distance of the swimmer from the destination device via the technologies discussed herein. Moreover, the communication means 706 may be additionally or alternatively used to program the destination device, for example, wirelessly or via a USB or micro USB port, being programmed with a unique ID and/or GPS position.

The power 708 may be provided by a "plug-in" source which provides continuous power, or may additionally and/or alternatively be provided by a battery source, possibly being a rechargeable or solar powered source.

Figure 7B:
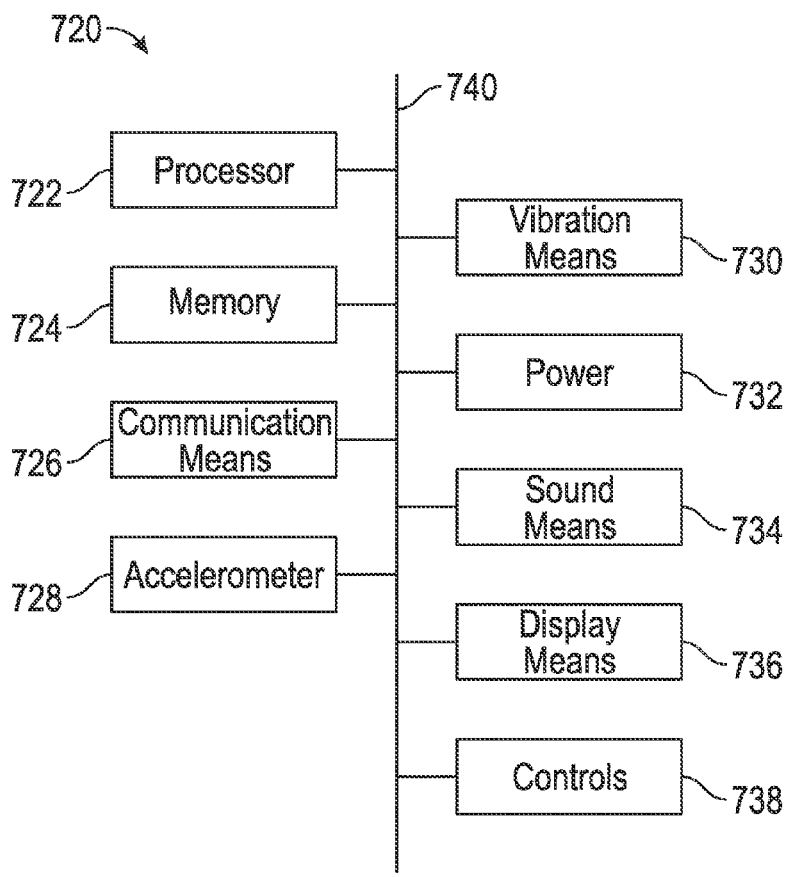
FIG. 7B depicts a block diagram of the directional guidance means, according to one or more embodiments.

FIG. 7B is a block diagram 720 of the directional guidance means, according to one or more embodiments. As depicted, the block diagram 720 includes a processor 722 and a memory 724, both of which are defined herein. In one embodiment, the memory 724 may be programmed with a predetermined course that includes information related to the location of each destination device, and possibly the unique ID of each as well.

The block diagram 720 also depicts a communication means 726, which can include one or more of the technologies discussed herein, including, but not limited to, radio frequencies (RF), Infrared (IR), laser beams, sonar, acoustic, proximity sensors (underwater, above water, or both), Bluetooth, Wi-Fi, and/or other long or short range wireless technology to obtain the position of the destination device and/or the distance of the swimmer therefrom. In one embodiment, the processor 722 may then determine the distance between the swimmer and the destination device. In some embodiments, such may be performed in combination with the processor 702 of the destination device and/or wireless communication to other computers or systems.

In further embodiments, alternatively or in addition thereto, the communication means 726 may enable transfer of data to or from the directional guidance means. For example, the communication means 726 may be a USB or micro-USB port configured to allow download of swimmer data and statistics from various swims to a computer for future comparison and analysis. Of course, those skilled in the art will appreciate such can be performed wirelessly as well, thus enabling technology such as Wi-Fi and Bluetooth to have dual functionality of data transfer and position determination.

In one embodiment, an accelerometer 728 is included, thereby enabling measurement of the swimmer's movements. For example, the processor 722 and/or memory 724 may read measurements by the accelerometer 728 during a swim, thereby enabling determination and analysis of the swimmer's information and statistics, such as stroke length, stroke count, interval distance, time between strokes, and the like. Such information may be stored in the memory 724 until it can be downloaded to a computing device, mobile device, server or the like.

The block diagram 720 further includes a vibration means 730 for indicating which direction to veer to the swimmer, and/or indicating other notifications (e.g., time to surface for diving, etc.). The vibration means 730 may be, for example, an electric motor or micro vibration motor or the like. The directional guidance means is powered by a power source 732, for example, a rechargeable or non-rechargeable battery. Moreover, such may be charged while the swimmer is swimming by an automatic or self-winding mechanism as known to those skilled in the art.

In further embodiments, the block diagram 720 includes a sound means 734, such as a mini or micro, possibly waterproof speaker. The sound means 734 may be used in addition to the vibration means 730 to alert the swimmer of the direction which they should turn. Moreover, the sound means may be employed to enable the swimmer to configure their device before swimming by announcing the settings and selected options.

Similarly, in even further embodiments, the block diagram 720 includes a display means 736. The display means may be a broad variety of display technologies, including, but not limited to, LED, LCD, or touchscreen technology, thereby enabling display of options to the user, and possibly control of such options (as compared to regular buttons which may be part of the directional guidance means). Advantageously, for those who are only partially visually impaired, the display means 736 enables an alternative form of configuration from the sound means 734 or a computer configuration. Moreover, swimmer with no visual impairment may use the system to gain the advantage of increased swimming concentration and less deviation from the point of destination, resulting in faster swim times.

In further embodiments, the directional guidance means includes controls 738, which may be used in combination with, or as an alternative from the display means 736 to determine and select configurations options. For example, such controls may be one or more buttons (not depicted) on the side or top of the directional guidance means. Moreover, such controls 738 may alternatively be used as quick option controls, such as for turning the directional guidance means on or off, or starting or stopping a swim timer.

One or more of the above processor 722, memory 724, communication means 726, accelerometer 728, vibration means 730, power 732, sound means 734, display means 736, and/or controls 738 may be electrically coupled via one or more busses 740.

Those of skill in the art will appreciate that the technologies discussed herein, such as GPS, radio frequencies (RF), Infrared (IR), laser beams, sonar, acoustic, proximity sensors (underwater, above water, or both), Bluetooth, Wi-Fi, and/or other long or short range wireless technology should not be interpreted as a limited list, and a single technology may be employed for multiple purposes, such as both location and distance (between the swimmer and destination device) determination. For example, GPS may be used to both locate a swimmer's position, but also help determine their distance from the destination device.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein.

All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") is closed herein is to be understood to set forth every number and range encompassed within the broader range of values.

Also, the terms in the claims have their plain, ordinary meaning unless otherwise explicitly and clearly defined by the patentee. Moreover, the articles "a" or "an," as used in the claims, are defined herein to mean one or more than one of the element that it introduces. As used herein the term "and/or" and "/" includes any and all combinations of one or more of the associated listed items. While compositions and methods are described in terms of "comprising," "containing," or "including" various components or steps, the compositions and methods can also "consist essentially of" or "consist of" the various components and steps.

It will be understood that the sizes and relative orientations of the illustrated elements are not shown to scale, and in some instances they have been reduced or exaggerated for purposes of explanation. Additionally, if there is any conflict in the usages of a word or term in this specification and one or more patent or other documents that may be incorporated herein by reference, the definitions that are consistent with this specification should be adopted.

What is claimed is:

1. A system for guiding a swimmer, comprising:
a destination device configured to be arranged near a destination location which a swimmer will swim towards;
direction determination means for determining a direction said swimmer should swim towards based, at least in part, on said swimmer's current position in reference to said destination device; and
directional guidance means for indicating to said swimmer said determined direction said swimmer should swim towards,
wherein said directional guidance means comprises a first guidance device configured to be worn by said swimmer while swimming and having first vibration means for vibrating said first guidance device, and
wherein said directional guidance means dynamically indicates for said swimmer to swim in said direction via at least said first vibration means.

2. The system of claim 1, wherein said directional guidance means further comprises a second guidance device configured to be worn by said swimmer while swimming and having second vibration means for vibrating said second guidance device,
wherein said first guidance device is configured to be worn on a right extremity of said swimmer and said second guidance device is configured to be worn on a left extremity of said swimmer,
wherein said directional guidance means further dynamically indicates for said swimmer to swim in said direction via said second vibration means.

3. The system of claim 2, wherein said right extremity is a right arm, and wherein said left extremity is a left arm.

4. The system of claim 2, further comprising a plurality of said destination devices, wherein each of said plurality of destination devices is associated with a unique ID.

5. The system of claim 4, further comprising a memory having a predetermined course of said plurality of destination devices stored therein.

6. The system of claim 1, further comprising distance determination means for determining an approximate first distance between said swimmer and said destination device, and wherein said directional guidance means is further configured to indicate to said swimmer said first distance.

7. The system of claim 6, wherein said first vibration means is configured to have a variable intensity of vibration, and wherein said intensity of said first vibration means increases upon said swimmer approaching a predetermined second distance from said destination device.

8. The system of claim 1, further comprising a processor configured to analyze data obtained during said swimmer's swim and providing an information output based thereon.

9. The system of claim 1, further comprising sound emitting means for generating a sound representative of said direction said swimmer should swim.

10. The system of claim 1, wherein said direction determination means comprises a global positioning system (GPS) configured to obtain a GPS position.

11. The system of claim 2, wherein said first vibration means operates to instruct said swimmer to turn in a first direction, said second vibration means operates to instruct said swimmer to turn in a second direction, and both said first and second vibration means operate simultaneously to instruct said swimmer to stay substantially on the current course.

12. The system of claim 1, further comprising a control device communicably coupled to said directional guidance means, and configured to activate at least said first vibration means in a vibration pattern which signals said swimmer to return to said destination device.

13. A method for guiding a swimmer, comprising:
determining a direction a swimmer should swim towards based, at least in part, on said swimmer's current position in reference to a destination device; and
dynamically indicating to said swimmer said determined direction via at least a first guidance device configured to be worn by said swimmer while swimming and having first vibration means for vibrating said first guidance device.

14. The method of claim 13, wherein dynamically indicating to said swimmer said determined direction further comprises a second guidance device configured to be worn by said swimmer while swimming and having second vibration means for vibrating said second guidance device,
wherein said first guidance device is configured to be worn on a right extremity of said swimmer and said second guidance device is configured to be worn on a left extremity of said swimmer.

15. The method of claim 13, further comprising a plurality of said destination devices, wherein the method further comprises associating each of said plurality of said destination devices with a unique ID.

16. The method of claim 15, further comprising storing a predetermined course of said plurality of destination devices in a memory.

17. The method of claim 13, further comprising determining an approximate first distance between said swimmer to said destination device, and indicating said first distance to said swimmer.

18. The method of claim 13, further comprising determining an approximate first distance between said swimmer to said destination device, and indicating said first distance to said user via said first vibration means.

19. The method of claim 18, further comprising increasing an intensity of said first vibration means upon said swimmer approaching a predetermined second distance from said destination device.

20. The method of claim 13, further comprising obtaining data during said swimmer's swim, analyzing said data, and providing an information output based thereon.

21. The method of claim 13, further comprising emitting a sound representative of said direction said swimmer should swim.

22. The method of claim 13, further comprising obtaining a global positioning system (GPS) position of said swimmer with a GPS, wherein said determining a direction a swimmer should swim towards is based at least in part on said GPS position.

23. The method of claim 14, wherein said first vibration means operates to instruct said swimmer to turn in a first direction, said second vibration means operates to instruct said swimmer to turn in a second direction, and both said first and second vibration means operate simultaneously to instruct said swimmer to stay substantially on said current course.

24. The method of claim 13, further comprising activating said first vibration means via a control device communicably coupled to said first guidance device such that said first vibration means vibrates in a pattern which signals said swimmer to return to said destination device.

* * * * *